BEST AVAILABLE COPY

W. R. Jackson.
Car Brake.
No. 197. A. L. Patented Mar. 30, 1858.

Fig. 1.

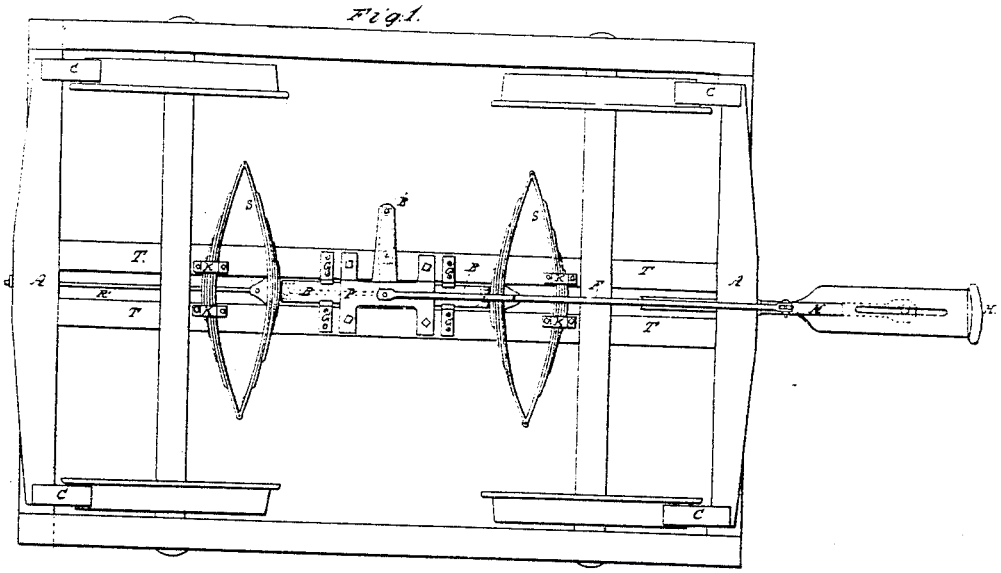

Fig. 3.

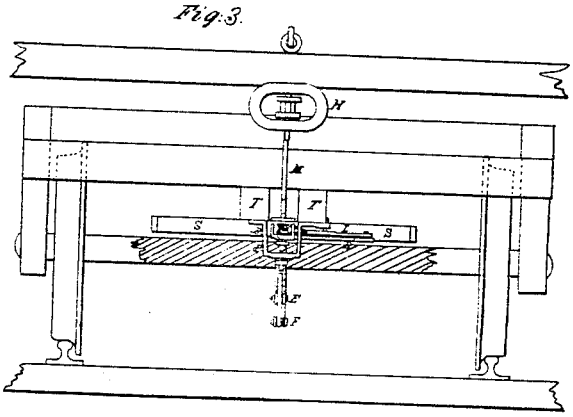

Fig. 2.

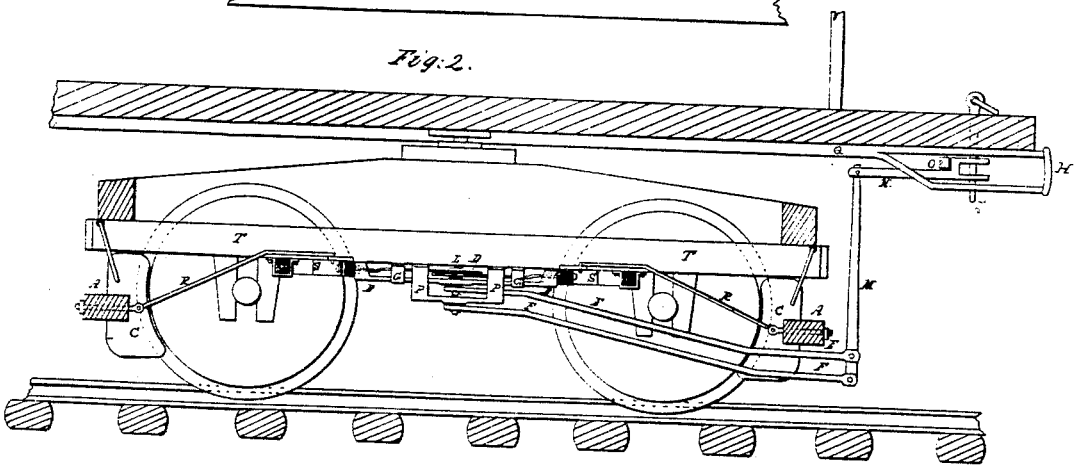

No. 197, to original Letters Patent No. 18,150.—*For improvement in Automatic Railroad Car Brake.*—I claim the arrangement of parts herein described, or its equivalent, for the simultaneous compression of the forward and rear springs and the consequent operation of the brakes, the same consisting in the combination of the lever L, with the slide bar B and pushing rods B D, constructed, arranged, and operated substantially in the manner specified.